United States Patent Office 2,799,355
Patented July 16, 1957

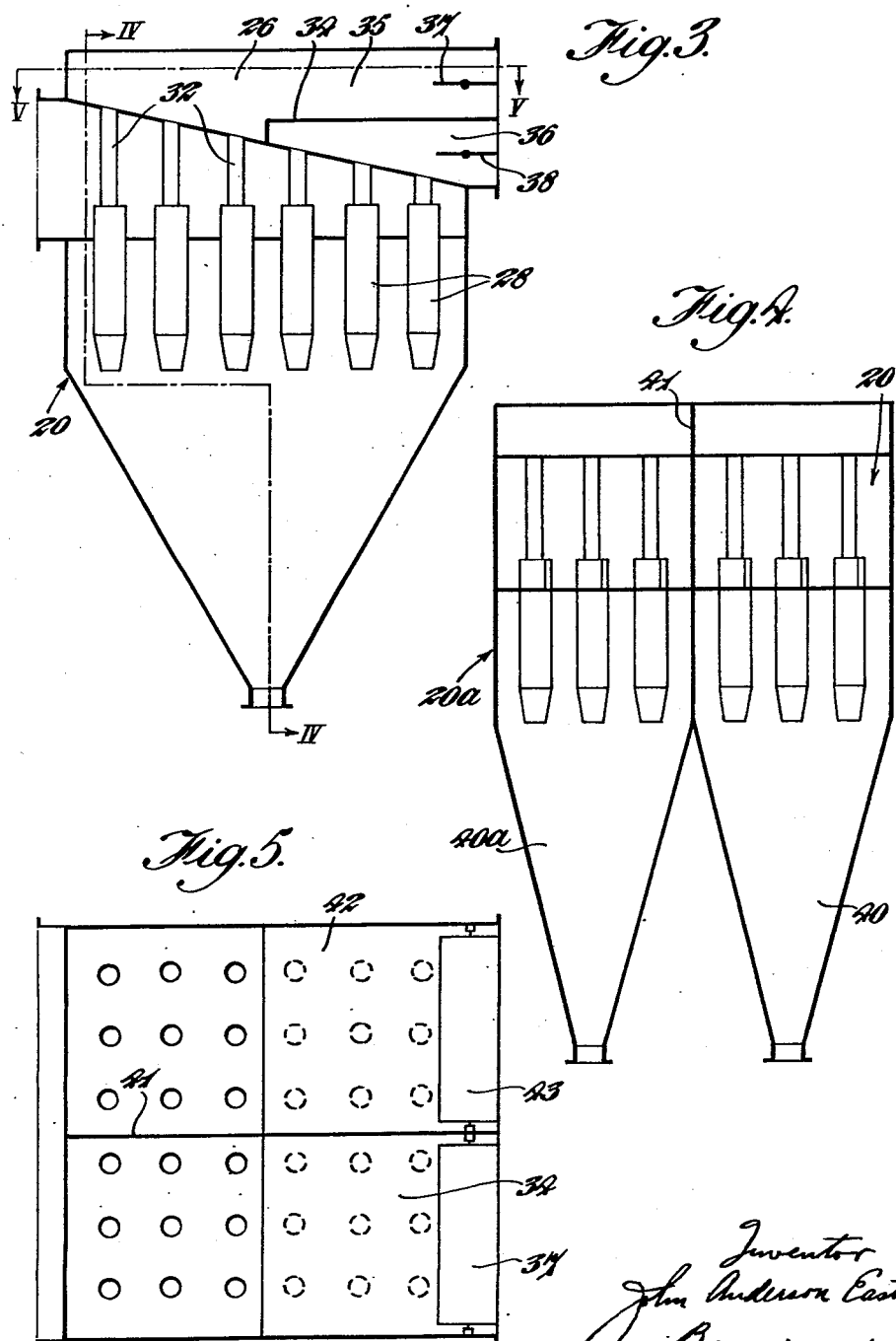

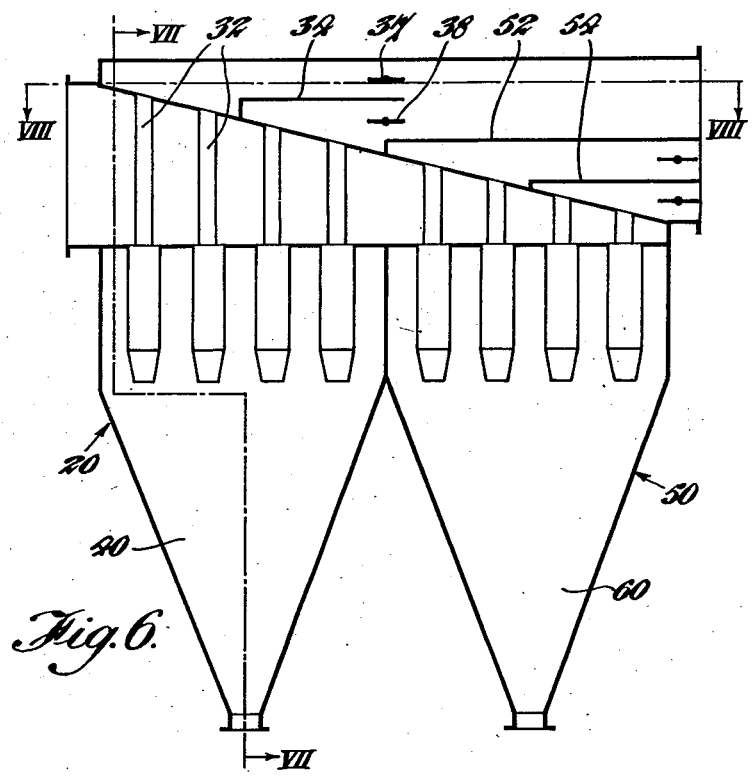
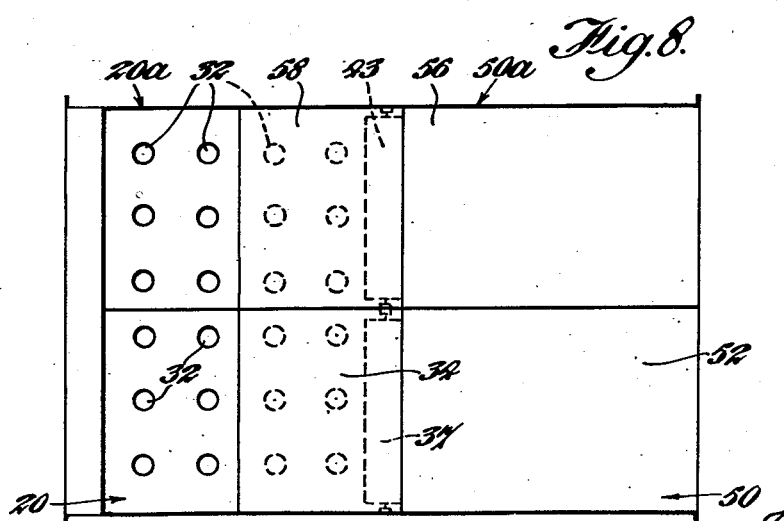

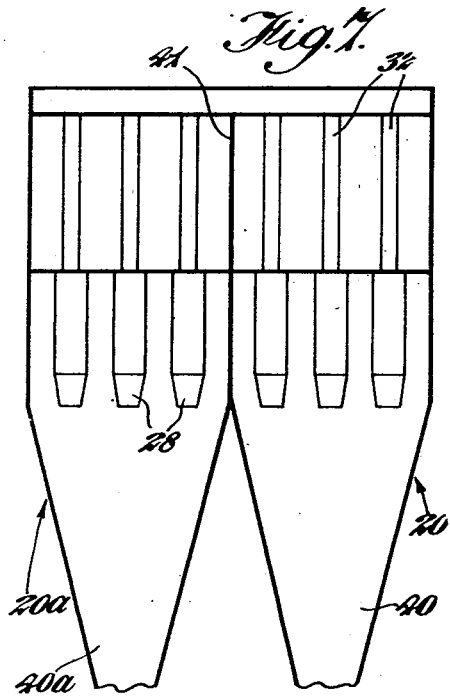

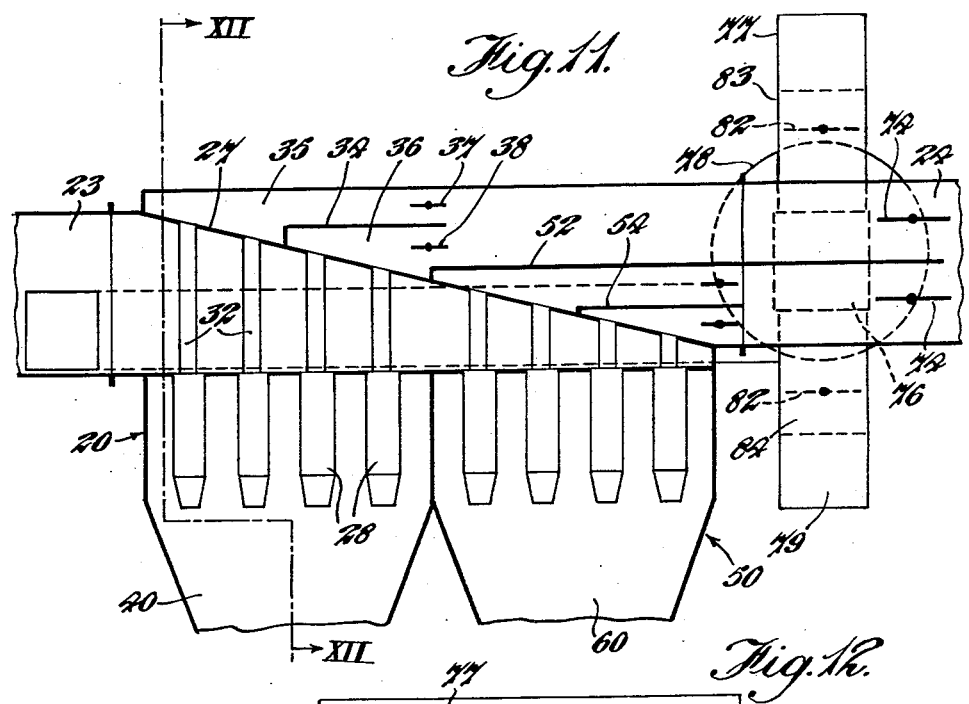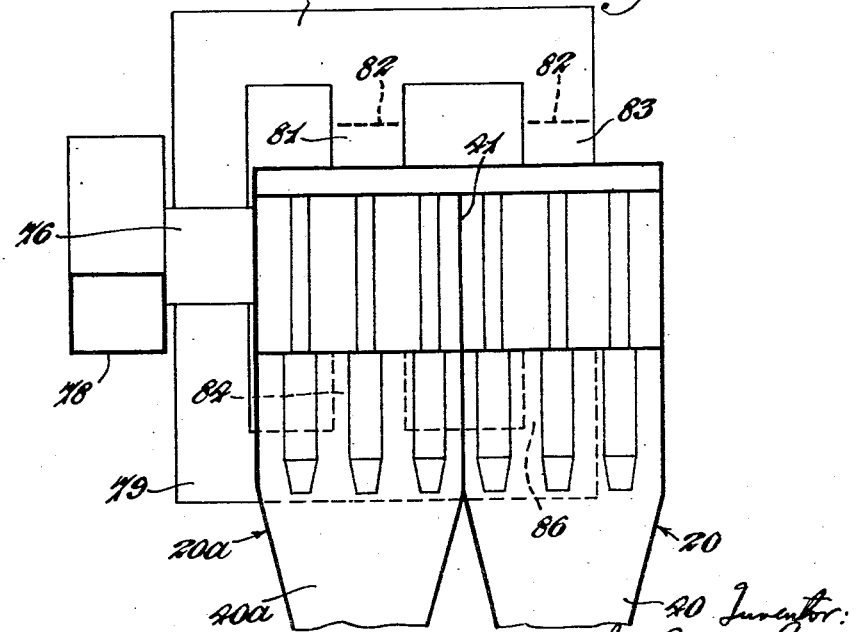

2,799,355

CENTRIFUGAL DUST SEPARATORS

John Anderson Easton, Glasgow, Scotland, assignor to James Howden & Co., Ltd., Glasgow, Scotland, a corporation of Great Britain Application October 7, 1953, Serial No. 384,675

Claims priority, application Great Britain October 8, 1952

3 Claims. (Cl. 183—37)

This invention relates to centrifugal dust separators of the multi-cell type having a plurality of separating cells of the return flow type arranged in parallel with respect to the flow of gases through the separator.

In separators of the return flow type dust separation is effected wholly or in part by a vortex action of dust laden gas within a cell body and the cleansed gas is removed from said body through a gas outlet tube of smaller bore communicating with said body. The separated dust is discharged from the opposite lower end of the cell body into a dust collecting chamber or hopper common to a number of cells.

In some cases it has been found that the fine dust carried along with the relatively clean gases through the gas outlet tubes is gradually deposited on the inner walls of said tubes and due to the resultant reduction in area of the tubes and the consequent increased resistance to flow the pressure loss across the separator increases.

One object of the present invention is to provide an apparatus for removing any fine dust deposited on the inner surface of the dust outlet tubes so as to maintain said outlet tubes free of dust and to maintain the pressure loss across the separator at a value for which the same has been designed.

Another object of this invention is to provide an apparatus for removing any fine dust deposited on the inner surface of the dust outlet tubes whilst maintaining the efficiency of the separator during such removing action.

A further object of the invention is to provide improved centrifugal dust separators which can be operated so as to remove at will the fine dust deposited in the gas outlet tubes of all or part of the dust separating elements.

A still further object of the invention is to provide a centrifugal dust separator wherein the outlet tubes of the separating elements may be cleansed of fine dust deposit or the like without impairing the efficiency of the dust separating action during the cleansing process.

The invention will be hereinafter more fully described with reference to the embodiments thereof illustrated by way of example in the accompanying drawings, in which:

Fig. 3 shows in longitudinal section a further construction of centrifugal dust separator consisting of two sections similar to that described with reference to Figs. 1 and 2;

Fig. 4 is a transverse section on the line IV—IV of Fig. 3;

Fig. 5 is a horizontal section along the line V—V of Fig. 3;

Figs. 6, 7 and 8 show a modified form of construction of centrifugal dust separator according to the invention, Fig. 6 being a longitudinal section, Fig. 7 a transverse section on the line VII—VII of Fig. 6 and Fig. 8 being a horizontal section on the line VIII—VIII of Fig. 6;

Figs. 11 and 12 show a further embodiment utilising a recirculating fan; Fig. 11 being a longitudinal section, and Fig. 12 a section on the line XII—XII of Fig. 11.

Figure 1:
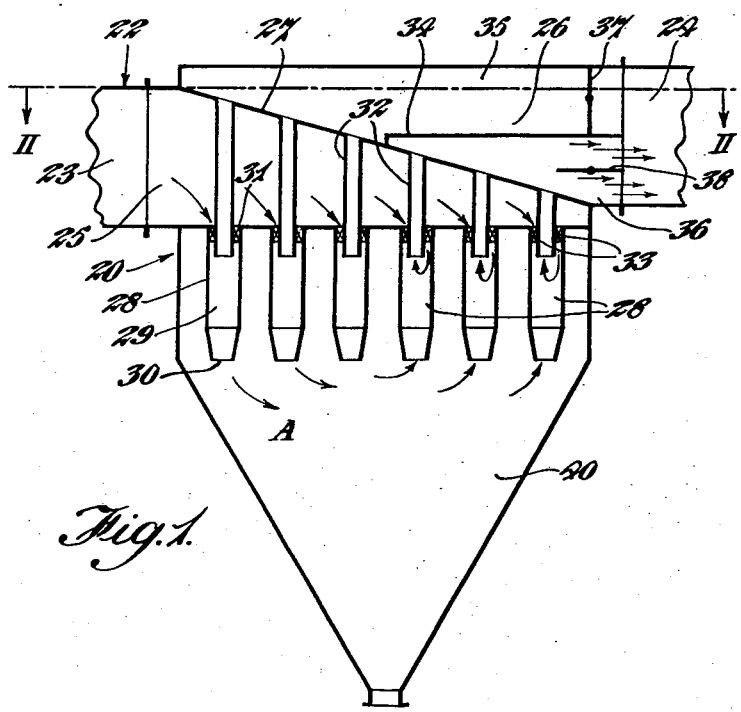
Fig. 1 shows diagrammatically in longitudinal section a centrifugal dust separator constructed according to the invention.
Figure 2:
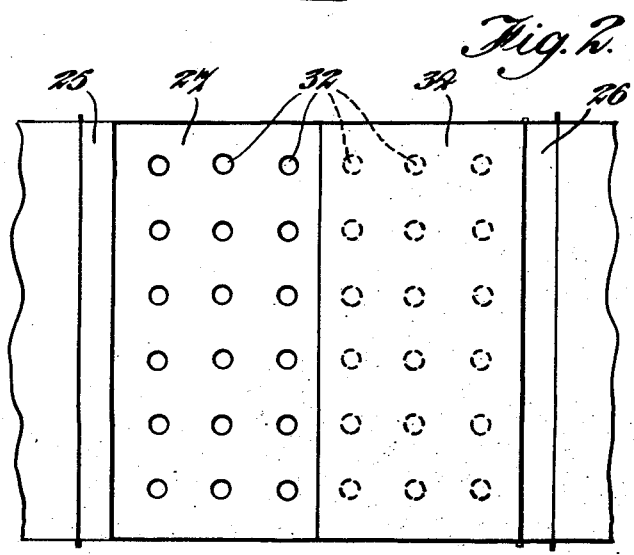
Fig. 2 is a horizontal section on the line II—II of Fig. 1.

Referring to Figs. 1 and 2 of the drawings a centrifugal separator denoted generally by 20 is inserted in a duct denoted generally by 22 and consisting of an inlet duct 23 and an outlet duct 24 between which the separator 20 is interposed. The separator 20 is formed with an inlet chamber 25 and an outlet chamber 26 which are isolated from one another by a partition 27.

The separator 20 comprises a number of separating cells 28 each comprising a cylindrical body member 29 having a dust outlet 30 and an inlet 31, the inlets of the respective separators 28 communicating with the gas inlet chamber 25. Each separator cell 28 is provided with a dust outlet tube 32 which communicates through the partition plate 27 with the outlet chamber 26. In the inlets 31 of the separators 28 are disposed means to produce a rotation of the entering dust laden gas stream and in the embodiment illustrated in Fig. 1 the inlet is provided with vanes indicated at 33 which cause the entering gas stream to rotate with a vortex motion within the cylindrical member 29. The dust particles are separated due to centrifugal force and pass downwardly through the separator cells 28 and out through the outlet opening 30. The cleaned gas stream passes upwardly through the outlet tubes 32.

In the outlet chamber 26 there is arranged a horizontal partition 34 which divides the chamber 26 into two separate sections 35, 36. Each section is provided with an isolating damper 37, 38 respectively, the damper in outlet chamber section 35 being shown as closed and the damper 38 in section 36 being shown as open, although during normal separating function both dampers 37 and 38 are open.

When it is desired to clean one of the groups of the outlet tubes 32, for example the tubes 32 opening into the outlet chamber section 36 the damper 37 disposed in the other outlet chamber 35 is closed as shown in Fig. 1. In such case the gas cleansed in the separator elements 28 cannot flow through the gas outlet tubes opening into the outlet chamber section 35 and instead passes downwardly through the cylindrical members 29 into the dust collecting chamber 40 and then upwardly as shown by the arrows A into the lower ends of those separator elements 28 whose outlet tubes 32 open into the outlet chamber section 36. This passage of the gas in the cylindrical members 29 of the last-mentioned group of separator members 28 interferes with the vortex action of the gas passing through said separator elements 28 from the inlet chamber 25 so that the efficiency of said separator elements is lowered thus causing coarser dust to pass through the outlet tube 32 of said group of separator elements 28 into the outlet chamber section 36. The passage of such dust through the outlet tubes 32 removes the fine dust deposit previously formed in said tubes.

Obviously the gas outlet tubes of those separator elements 28 opening into the outlet chamber section 35 may be scavenged in a similar manner by opening the damper 37 and closing the damper 38.

A further construction is shown in Figs. 3 to 5 wherein the separator 20 consists of two separators similar to that described with reference to Figs. 1 and 2 located side-by-side in the direction of gas flow therethrough. As shown in Fig. 3 the dust separator 20 constructed in a manner similar to that of Fig. 1 is provided with separator elements 28 and a gas outlet chamber 26 divided by a horizontal partition 34 into two sections 35, 36. Each of the sections 35, 36 is provided respectively with a damper 37, 38. In addition there is a further separator constructed similarly to that shown in Fig. 3 and indicated by 20a in Fig. 4. The two separator units 20 and 20a are divided by a vertical partition 41 and each separator unit is provided with a dust collecting chamber denoted by 40 and 40a respectively. The separator 20a is provided similarly to separator 20 with a horizontal partition 42 corresponding to partition 34 of separator 20. Similarly the outlet chamber sections formed by the horizontal partition 42 are provided with damper elements corresponding to the damper elements 37, 38, one of said damper elements being shown at 43 in Fig. 5.

The separator disclosed in Figs. 3 to 5 therefore includes two similar separator units 20, 20a which are constructed in the same manner and may be considered as separate units as regards separation and collection and as regards the cleansing of the outlet tubes 32. The said outlet tubes of each unit may be cleaned in the manner described with reference to Figs. 1 and 2.

A further construction of centrifugal dust separator is shown in Figs. 6 to 8. In this case the device comprises two similar units, 20, 20a placed side-by-side in the direction of flow of gas, the said units being subdivided into two further units disposed one behind the other in the direction of flow of gas. These two latter units are indicated by 20 and 50 in Figs. 6 and 8 and the corresponding units disposed laterally thereof are indicated by 20a and 50a in Fig. 8.

As will be noted from Figs. 6 to 8, the units disposed side-by-side are separated by a vertical partition 41 while the unit 20 is separated from the unit 50 by virtue of a horizontal partition 52 disposed in the outlet chamber of the separator units 20, 50. The outlet chambers of the respective units are subdivided into sections by further horizontal partitions 34, 54 as shown in Fig. 6 while the outlet chambers of the units 20a, 50a are separated by a horizontal partition 56 to form two units, each of which is subdivided by a further horizontal partition, one of which is shown at 58.

The separator thus comprises four separate units disposed alongside one another in pairs, each unit being provided with its own dust collector, the various dust collectors being shown at 40, 40a and 60 respectively, one of the said dust collectors not being visible in the figures. In addition the outlet chamber of each separator unit is subdivided into sections by a horizontal partition 34, 54, 58 respectively and each of the sections of the outlet chamber is provided with isolating dampers designated by 37, 38, 43.

As will be understood, groups of outlet tubes 32 discharging into the various sections of the outlet chamber may be cleaned in turn by the manipulation of the isolating dampers as previously described with reference to Figs. 1 and 2. As will be noted, each unit is provided with its own individual dust collecting chamber.

In the separator above-described with reference to Figs. 1 to 8 the overall dust separating efficiency of the separator is impaired during the scavenging treatment since in each case some coarser dust is allowed to enter the clean gas outlet tubes.

Figure 9:
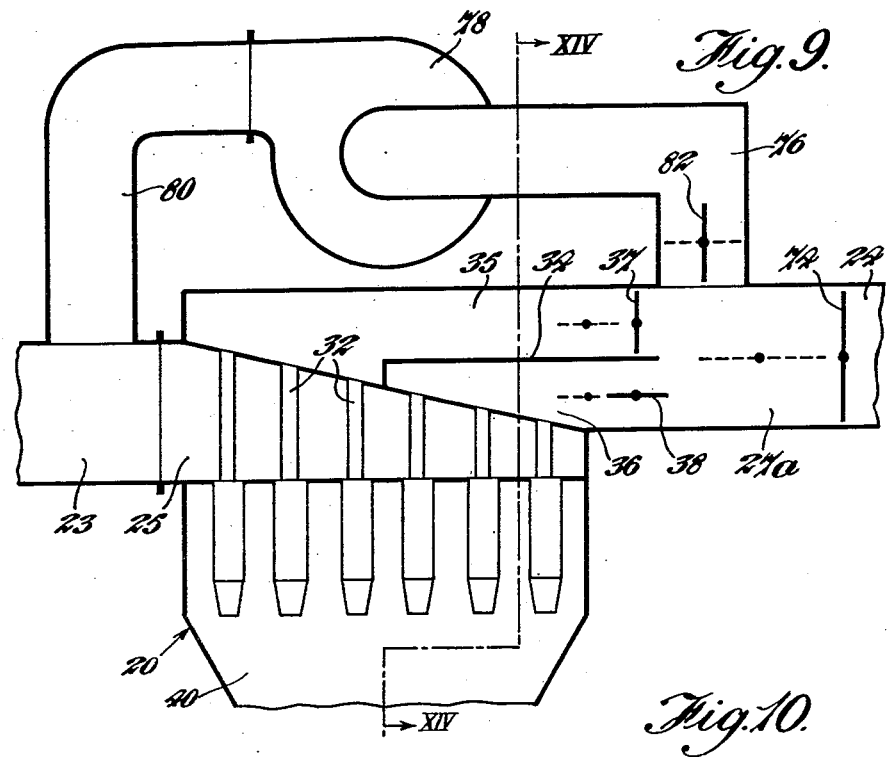
Figs. 9 and 10 show in longitudinal and transverse section respectively a further embodiment of the invention.
Figure 10:
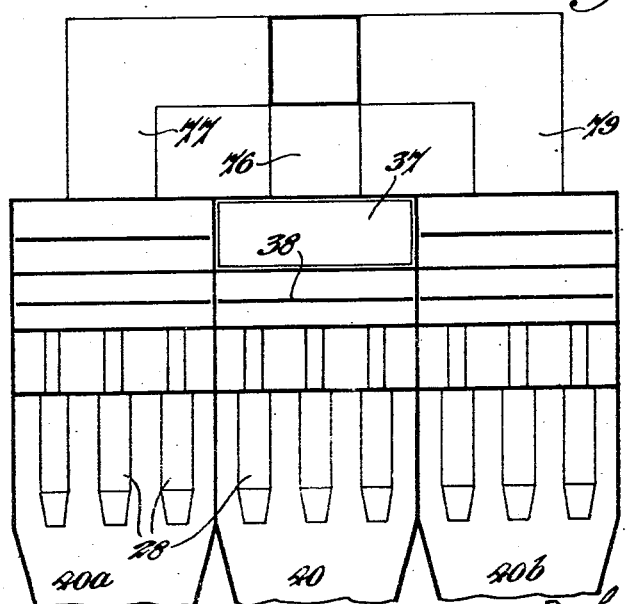

The construction shown in Figs. 9 and 10 provides an arrangement wherein the efficiency of the separating plant is maintained during operation of the scavenging system.

Referring to Figs. 9 and 10 these show a centrifugal dust separator designated generally by 20 which consists of three separating units disposed side-by-side in the direction of flow of the gas stream. Each separator unit has its inlet chamber 25 communicating with the gas inlet duct 23 and has its outlet chamber 27a divided by a horizontal partition 34 into two sections 35, 36, each containing an isolating damper 37, 38 respectively. In addition there is provided in each gas outlet chamber 27a a main isolating damper 74 adapted to shut off the gas outlet chamber 27a of each separator unit from the gas outlet duct 24.

Between the location of the section isolating dampers 37, 38 and the main outlet duct isolating damper 34 is disposed the inlet conduit 76 of a suction fan 78 which discharges through a discharge conduit 80 into the gas inlet duct 23. The suction fan 78 has an inlet conduit 76 communicating with each of the separator units as shown more particularly in Fig. 10 wherein the suction conduit 76 is shown connected to the centre separator unit and auxiliary suction conduits 77 and 79 are shown communicating respectively with the outer separator units. Each inlet conduit 76, 77, 79 is provided with an isolating damper, one of which is shown at 82 in Fig. 9. As in the previous embodiments, each separator unit comprising two sections is provided with its individual dust collecting chamber 40, 40a and 40b respectively.

When utilising the above-described scavenging system it is preferable to scavenge only one separator unit at a time. This is effected by isolating the particular unit from the main gas outlet flue 24 by closing the damper 74 and opening the suction fan isolating damper 82. The dampers in the sections of the separator unit so isolated are arranged so that the damper of one section, for example damper 37, is closed and the damper of the other section, damper 38, is open.

When the circulating suction fan 78 is operated the dust stream which has passed through that group of separators communicating with the outlet section 35 passes upwardly through that group of separators communicating with the outlet section 36 and in its passage carries coarse dust particles along with it which together with coarse particles present in the stream tending to pass through said separators communicating with outlet section 36 exert a scavenging action on the gas outlet tubes 32 communicating with the outlet chamber section 36. The coarse dust particles and the liberated fine dust particles then pass through the fan and are discharged thereby through the outlet conduit 80 into the main gas inlet duct 23 adjacent and upstream of the separator so that no coarse particles pass into the clean gas outlet duct 24.

When the scavenging action is complete the section damper 37 is opened and the damper 38 closed so that a scavenging action is exerted on the gas outlet tubes 32 of the group of separators communicating with the outlet chamber section 35. Similarly the sections of the other separator units can be treated in the same manner to remove the accumulated fine dust particles in the gas outlet tubes of the separators appertaining to the particular sections.

While in the construction described with reference to Figs. 9 and 10 the separator is illustrated as divided into three units disposed side-by-side it is preferable for the separator to be divided into a larger number of units in order to reduce the size of the recirculating fan.

Although in the majority of the constructions previously described the dust separating elements 28 have been described as provided with vaned inlets to produce a vortex motion of the entering gas and dust it is obvious that the invention may be applied to separators having the independent separating elements provided with other known forms of inlets adapted to produce the said vortex motion of the entering gas and dust. For example, the inlets to the separator elements may be of the well-known tangential type, as indicated diagrammatically in the construction shown in Figs. 3 to 5.

It is to be noted that a recirculating fan as described with reference to Figs. 9 and 10 may be applied to any other of the constructions of centrifugal separators above described provided with a plurality of units. For example, in Figs. 11 and 12 is shown a separator of the general construction described with reference to Figs. 6 to 8 to which has been applied a recirculating fan 78.

In this case the separator comprises four separate units disposed alongside one another in pairs, each unit being provided with its own dust collector as shown at 40, 40a and 60. In addition the outlet chamber of each separate unit is sub-divided into sections by a horizontal partition as shown at 34, 54, and each of the sections of the outlet chamber is provided with isolating dampers as indicated by 37, 38.

A suction fan 78 is connected as described with reference to Figs. 9 and 10 so that its inlet conduit 76 communicates with the outlet chamber of each separator unit and its discharge conduit 80 communicates with the gas inlet duct 23.

As shown, the inlet conduit 76 is branched into two conduits 77, 79, located respectively above and below the outlet chambers of the separator. The conduit 77 is branched into two further conduits 81, 83 connected to the upper unit outlet chambers and the conduit 79 is branched into two conduits 84, 86 communicating with the two lower unit outlet chambers. Each of the said conduit branches 81, 84, 83 and 86 contains an isolating damper 82, while the outlet chamber of each unit is provided with a main isolating damper 74 adapted to shut off the outlet chamber of each separator unit from the gas outlet duct 24.

As described with reference to Figs. 9 and 10, one unit only is preferably cleaned at one time by closing the main isolating damper 74 and opening its respective fan isolating damper 82. Each section of the particular unit being treated is cleaned in succession as previously described by opening damper 37 and closing damper 38 and vice versa.

Is will be understood that by suitable arrangements of vertical and horizontal partitions, dampers and the like, scavenging may be obtained over the whole or any selected part of the dust separator without requiring for the scavenging operation any additional gas stream or supply of coarse dust particles.

I claim:
1. A centrifugal dust separator having a plurality of dust separating elements of the return flow type arranged in parallel with respect to the flow of gases through said separator from an inlet chamber to an outlet chamber, comprising partition means dividing said separating elements into a plurality of units having individual outlet chambers, partition means subdividing each of said outlet chambers into at least two outlet chamber sections, selective means for isolating each of said outlet chambers from the main flow of gases through said separator, selective means for isolating each of said outlet chamber sections, a purality of dust collecting chambers individual respectively to each of said units, and a suction fan having its inlet selectively communicating with each of said unit outlet chambers and its outlet communicating with the main flow of gases through said separator at a zone upstream of said separator.

2. A centrifugal dust separator having a plurality of dust separating elements of the return flow type arranged in parallel with respect to the flow of gases through said separator from an inlet chamber to an outlet chamber comprising partition means dividing said separating elements into a plurality of units having individual outlet chambers, partition means in the outlet chamber of each unit subdividing said chamber into at least two outlet chamber sections, a damper device in the outlet chamber of each unit, a damper device in each of said outlet chamber sections, a suction fan having an inlet conduit and an outlet conduit, said inlet conduit communicating with the outlet chamber of each of said units and said outlet conduit communicating with the inlet chamber of said separator, means to control the flow of gases selectively from the outlet chamber of each of said units into said fan inlet conduit and a plurality of dust collecting chambers respectively inividual to each of said units.

3. In a centrifugal dust seperating apparatus, the combination of a dust separator having a plurality of dust separating cells arranged in parallel with respect to the flow of dust-laden gases through said separator, each of said cells having at one end a dust outlet and at the opposite end a gas outlet flow tube individual to each cell, of means for removing fine dust deposit from the walls of said gas outflow tubes by the scavenging action of coarse dust particles which comprises an inlet chamber for dust-laden gas containing coarse dust particles communicating with all said separating cells, a dust collecting chamber in communication with the dust outlets of all of said dust separating cells and selective means to cut off the flow of gases through the gas outflow tubes of some only of said cells whereby the gas already cleansed of the major part of the coarse dust particles in said last-mentioned cells is caused to enter the dust outlets of the others of said cells and thereby to reduce the dust separating efficiency of said other cells and to cause the coarse dust particles contained in the gases entering said other cells to flow outwardly through the gas outflow tubes of said other cells and thereby exert a scouring action on said tubes.

References Cited in the file of this patent
UNITED STATES PATENTS

| | | |
|---|---|---|
| 1,916,337 | Schmidt | July 4, 1933 |
| 1,970,077 | Collins | Aug. 14, 1934 |
| 2,323,707 | Danz | July 6, 1943 |
| 2,588,106 | Frangquist | Mar. 4, 1952 |